United States Patent
Yu et al.

(10) Patent No.: US 9,128,317 B2
(45) Date of Patent: Sep. 8, 2015

(54) LIQUID CRYSTAL MODULE HAVING F-TYPE FRAMES AND ASSEMBLY METHOD THEREOF

(71) Applicants: Gang Yu, Guangdong (CN); Pei Jia, Guangdong (CN); Liuyang Yang, Guangdong (CN)

(72) Inventors: Gang Yu, Guangdong (CN); Pei Jia, Guangdong (CN); Liuyang Yang, Guangdong (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 291 days.

(21) Appl. No.: 13/703,069

(22) PCT Filed: Nov. 5, 2012

(86) PCT No.: PCT/CN2012/084087
§ 371 (c)(1),
(2) Date: Dec. 10, 2012

(87) PCT Pub. No.: WO2014/067160
PCT Pub. Date: May 8, 2014

(65) Prior Publication Data
US 2014/0118659 A1 May 1, 2014

(30) Foreign Application Priority Data
Oct. 29, 2012 (CN) .......................... 2012 1 0420946

(51) Int. Cl.
*G02F 1/1333* (2006.01)
(52) U.S. Cl.
CPC ................... *G02F 1/133308* (2013.01); *G02F 2001/133322* (2013.01)

(58) Field of Classification Search
CPC .......... G02F 2001/133317; G02F 2001/13332; G02F 1/133308; G02F 2001/133322; G02F 2001/133325; G02F 2001/133328
USPC ............. 349/58, 187; 362/632–634; 361/681, 361/714, 752, 644, 728–730, 679; 345/905; 313/582–587, 498–512; 348/794, 348/E5.128; 248/309.1, 200
See application file for complete search history.

(56) References Cited

U.S. PATENT DOCUMENTS

2007/0115401 A1* 5/2007 Tsubokura et al. ............. 349/58
2007/0222910 A1* 9/2007 Hu .................................. 349/58
(Continued)

FOREIGN PATENT DOCUMENTS

CN 202275236 6/2012
JP 2010049124 A * 3/2010

*Primary Examiner* — Michael Caley
*Assistant Examiner* — Jia Pan
(74) *Attorney, Agent, or Firm* — Kirton McConkie; Evan R. Witt

(57) ABSTRACT

The present invention discloses a liquid crystal module having F-type frames and an assembly method thereof. An F-type frame assembly according to the present invention is assembled by a plurality of F-type frames. Each of the F-type frames has a cross-section of F shape, and has a first opening portion located in an upper half thereof and a second opening portion located in a lower half thereof. Besides, the first opening portions and the second opening portions of all of the F-type frames are correspondingly facing inward, so as to form a first receiving space and a second receiving space, respectively. In the present invention, by placing a liquid crystal panel in the first receiving space and placing a backlight module in the second receiving space, a liquid crystal module is assembled.

6 Claims, 4 Drawing Sheets

(56) References Cited

U.S. PATENT DOCUMENTS

| | | | |
|---|---|---|---|
| 2008/0192412 A1* | 8/2008 | Tsai | 361/679 |
| 2010/0155387 A1* | 6/2010 | Le Gall et al. | 219/465.1 |
| 2010/0201907 A1* | 8/2010 | Toriyama et al. | 349/58 |
| 2011/0209431 A1* | 9/2011 | Tsai | 52/656.9 |
| 2012/0162546 A1* | 6/2012 | Shimomichi | 348/794 |
| 2012/0242926 A1* | 9/2012 | Hsu et al. | 349/58 |
| 2013/0100372 A1* | 4/2013 | Wu et al. | 349/58 |

\* cited by examiner

LIQUID CRYSTAL MODULE HAVING F-TYPE FRAMES AND ASSEMBLY METHOD THEREOF

FIELD OF THE INVENTION

The present invention relates to a liquid crystal module and an assembly method thereof, and more particularly to a liquid crystal module having F-type frames and an assembly method thereof.

BACKGROUND OF THE INVENTION

A liquid crystal display (LCD) is a kind of flat panel display (FPD) which displays images by the property of the liquid crystal material. In comparison with other display devices, the LCD has the advantages in lightweight, compactness, low driving voltage and low power consumption, and thus has already become the mainstream product in the whole consumer market. However, the liquid crystal material of the LCD cannot emit light by itself, and must depend upon an external light source. Thus, the LCD further has a backlight module to provide the needed light source.

Generally speaking, backlight modules have been developed based on size requirements into edge lighting type structures and bottom lighting type structures, which are categorized by locations of lamp tubes thereof. A light source of the edge lighting type structures is a single light source placed aside, and a light source of the bottom lighting type structures is placed right beneath. The lamp tubes of the backlight modules must be featured with high brightness and a long lifespan, etc., and include cold cathode fluorescent lamps (CCFL), hot cathode fluorescent lamps, light emitting diodes (LED) and electroluminescence (EL), etc. Nowadays, with the rise of environmental consciousness, because that using LEDs as backlight sources has an advantage of energy saving and environmental protection in comparison with the CCFL, it thus becomes a trend in backlight development to replace the CCFL by the LEDs. Besides, by using LEDs as a backlight source, an LCD or LCD TV is further developed toward a design direction of narrow frame.

Referring now to FIG. 1, a schematic cross-sectional side view of a traditional liquid crystal module is illustrated in FIG. 1. Specially explaining, for conveniently describing, the contents of this figure is shown with a simple and schematic method. A traditional liquid crystal module 90 comprises a back plate 91, a light guide plate and optical film assembly 92, a plastic housing 93, a liquid crystal panel 94 and a front frame 95. The back plate 91 is used for loading light sources (not shown) and the light guide plate and optical film assembly 92; the plastic housing 93 is disposed on an outer side of the back plate 91 downward from the top, and fix the light guide plate and optical film assembly 92 to form a backlight module; the liquid crystal panel 94 is loaded on the plastic housing 93; and the front frame 95 fixes the liquid crystal panel 94 on the backlight module. However, in the design and assembly process of the whole liquid crystal module 90, because the plastic housing 93 and the front frame 95 are needed for fixing the components, respectively, it will repeat a part of functions thereof and increase assembly steps. Besides, because the structure is more complex, it is disadvantageous for a development trend that LCD is designed toward narrow frame.

As a result, it is necessary to provide a liquid crystal module having F-type frames and an assembly method thereof to solve the problems existing in the conventional technologies.

SUMMARY OF THE INVENTION

A primary object of the present invention is to provide a liquid crystal module having F-type frames and an assembly method thereof, so as to solve the problem existing in the conventional technologies: it is necessary to have a plastic housing and a front frame for assembly of backlight module and liquid crystal module.

To achieve the above object, the present invention provides a liquid crystal module, which comprises:

an F-type frame assembly assembled by a plurality of F-type frames, wherein each of the F-type frames has a cross-section of F shape, and has a first opening portion located in an upper half thereof and a second opening portion located in a lower half thereof; and the first opening portions and the second opening portions of all of the F-type frames are correspondingly facing inward, so as to form a first receiving space and a second receiving space, respectively;

a liquid crystal panel disposed in the first receiving space; and a backlight module disposed in the second receiving space.

In one embodiment of the present invention, the F-type frame assembly is assembled by two of the F-type frames, each of which has an U-shaped top view profile.

In one embodiment of the present invention, the F-type frame assembly is assembled by two of the F-type frames, each of which has an L-shaped top view profile.

In one embodiment of the present invention, the F-type frame assembly is assembled by two of the F-type frames, one of which has an U-shaped top view profile, and the other of which has an I-shaped top view profile.

In one embodiment of the present invention, the F-type frame assembly is assembled by four of the F-type frames, each of which has an I-shaped top view profile.

In one embodiment of the present invention, the F-type frame assembly is assembled by the F-type frames, one portion of which have an I-shaped top view profile, and the other portion of which have an L-shaped top view profile.

To achieve the above object, the present invention further provides an F-type frame assembly of a liquid crystal module, which is assembled by a plurality of F-type frames, wherein each of the F-type frames has a cross-section of F shape, and has a first opening portion located in an upper half thereof and a second opening portion located in a lower half thereof; and the first opening portions and the second opening portions of all of the F-type frames are correspondingly facing inward, so as to form a first receiving space and a second receiving space, respectively.

In one embodiment of the present invention, a liquid crystal panel is disposed in the first receiving space.

In one embodiment of the present invention, a backlight module is disposed in the second receiving space.

To achieve the above object, the present invention further provides an assembly method of a liquid crystal module, which comprises steps of:

(a) preparing a plurality of F-type frames, wherein each of the F-type frames has a cross-section of F shape, and has a first opening portion located in an upper half thereof and a second opening portion located in a lower half thereof;

(b) correspondingly disposing the first opening portions and the second opening portions of all of the F-type frames inward to form a first receiving space and a second receiving space, respectively, and then placing a liquid crystal panel in the first receiving space;

(c) assembling the F-type frames to form an F-type frame assembly, so that the liquid crystal panel is enclosed and fixed in the first receiving space; and (d) placing a backlight module in the second receiving space of the F-type frame assembly.

In the present invention, by just using a single F-type frame assembly, it can simultaneously assemble and fix a backlight module and a liquid crystal panel to form a liquid crystal module. Hence, the present invention can simplify the frame design of the liquid crystal module, so it is advantageous for a development trend that LCD is designed toward narrow frame.

DETAILED DESCRIPTION OF THE PREFERRED EMBODIMENTS

The foregoing objects, features and advantages adopted by the present invention can be best understood by Referring now to the following detailed description of the preferred embodiments and the accompanying drawings. Furthermore, the directional terms described in the present invention, such as upper, lower, front, rear, left, right, inner, outer, side and etc., are only directions Referring now to the accompanying drawings, so that the used directional terms are used to describe and understand the present invention, but the present invention is not limited thereto.

Figure 1:
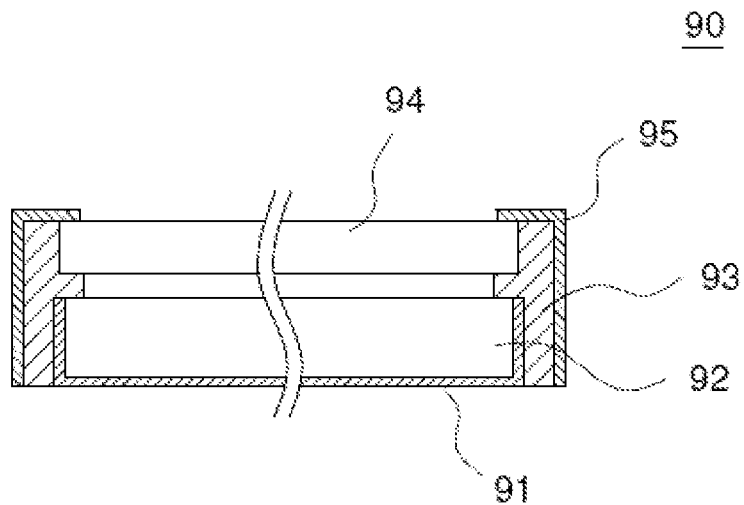
FIG. 1 is a schematic cross-sectional side view of a traditional liquid crystal module.
Figure 2:
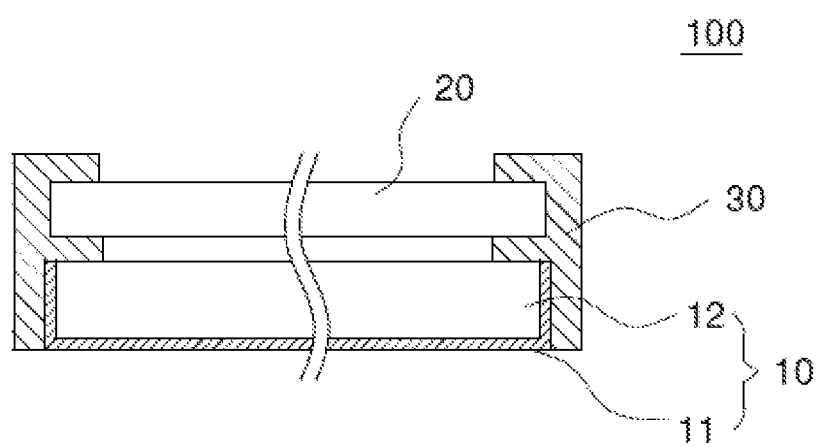
FIG. 2 is a schematic cross-sectional side view of a liquid crystal module according to a preferred embodiment of the present invention.

Referring now to FIG. 2, a schematic cross-sectional side view of a liquid crystal module according to a preferred embodiment of the present invention is illustrated in FIG. 2. Specially explaining, for conveniently describing, the contents of this figure are shown with a simple and schematic method. A liquid crystal module 100 according to the present invention comprises a backlight module 10, a liquid crystal panel 20 and an F-type frame assembly 30. The F-type frame assembly 30 is assembled by a plurality of F-type frames, and the assembly method thereof will be particularly described hereinafter.

Figure 3:
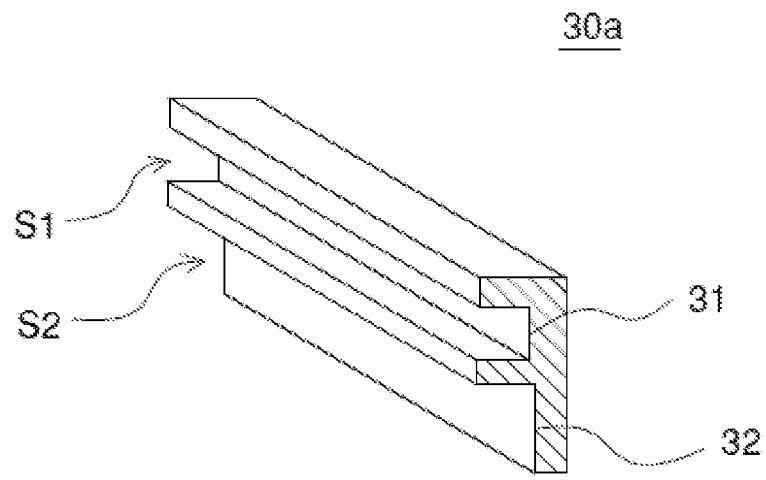
FIG. 3 is a partial perspective schematic view of an F-type frame according to the preferred embodiment of the present invention.

Referring now to FIG. 3, a partial perspective schematic view of an F-type frame according to the preferred embodiment of the present invention is illustrated in FIG. 3. The F-type frame assembly 30 is assembled by a plurality of F-type frames 30a, wherein the cross-section of the F-type frame 30a is a shape of "F" letter, which has a first opening portion 31 located in the upper half thereof and a second opening portion 32 located in the lower half thereof. Moreover, the first opening portions 31 and the second opening portions 32 of all of the F-type frames 30a are inward to form a rectangular frame (as shown in FIG. 2). Besides, the locations of the first opening portions 31 jointly form a first receiving space S1, and the locations of the second opening portions 32 jointly form a second receiving space S2.

Referring to FIG. 2, the liquid crystal panel 20 is disposed in the first receiving space S1, and the backlight module 10 is disposed in the second receiving space S2. For detailed description, the backlight module 10 comprises at least one light source assembly (not shown), a back plate 11 and a light guide plate assembly 12 (comprising of an optical film assembly), but do not comprise a plastic housing structure which is traditionally used for fixing the light guide plate assembly 12 in the back plate. However, for conveniently describing, in the present invention, the back plate 11 and the light guide plate assembly 12 are called as the backlight module 10.

Moreover, the assembly method of the liquid crystal module 100 according to the present invention is different from the assembly method of a traditional liquid crystal module, it is described as follows:

Step (a), firstly, preparing the F-type frames 30a;

Step (b), next, correspondingly disposing the first opening portions 31 and the second opening portions 32 of all of the F-type frames 30a inward to form a first receiving space S1 and a second receiving space S2, respectively, and then placing a liquid crystal panel 20 in the first opening portions 31 (the first receiving space S1);

Step (c), assembling the F-type frames 30a to form an F-type frame assembly 30, so that the liquid crystal panel 20 is enclosed and fixed in the first receiving space S1; and Step (d), disposing the F-type frame assembly 30 to cover on a backlight module 10, namely, placing the backlight module 10 in the second receiving space S2 of the F-type frame assembly 30.

To compare with the traditional technology, it is necessary to have a plastic housing and a front frame for assembly of backlight module and liquid crystal module. In the assembly process of the liquid crystal module 100 according to the present invention, it can simultaneously assemble and fix the backlight module 10 and the liquid crystal panel 20 to form the liquid crystal module 100 by using the F-type frame assembly 30. Hence, the F-type frame assembly 30 according to the present invention can simplify the frame design of the liquid crystal module 100, so it is advantageous for the LCD is toward a development trend of narrow frame design.

Referring now to FIGS. 4A to 4E, schematic top views of various F-type frames according to the present invention are illustrated in FIGS. 4A to 4E.

Figure 4A:
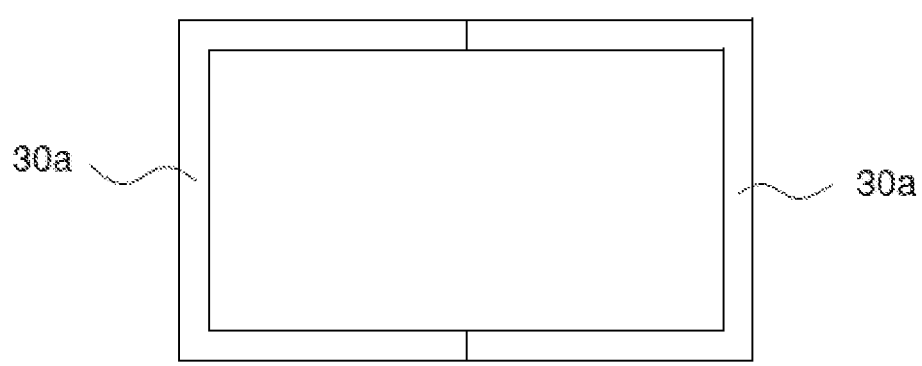
FIGS. 4A to 4E are schematic top views of various F-type frames according to the present invention.

As shown in FIG. 4A, the F-type frame assembly 30 is assembled by two of the F-type frames 30a, each of which has an U-shaped top view profile.

Figure 4B:
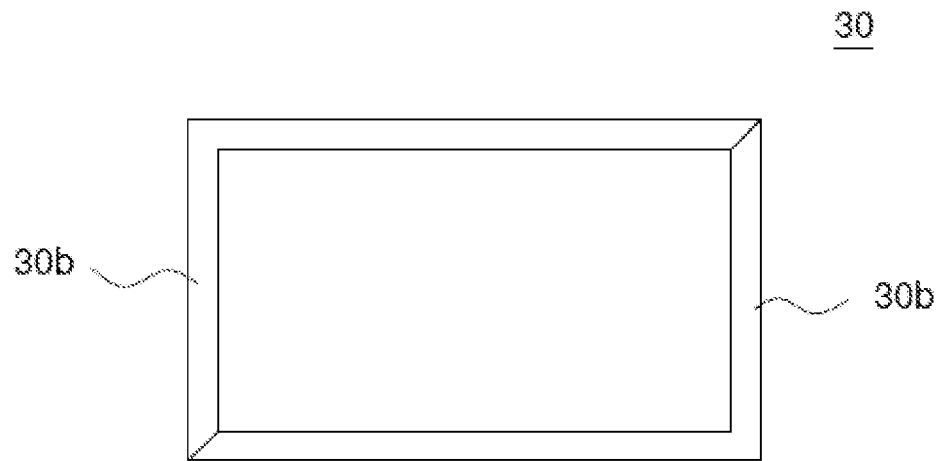

As shown in FIG. 4B, the F-type frame assembly 30 is assembled by two of the F-type frames 30b, each of which has an L-shaped top view profile.

Figure 4C:
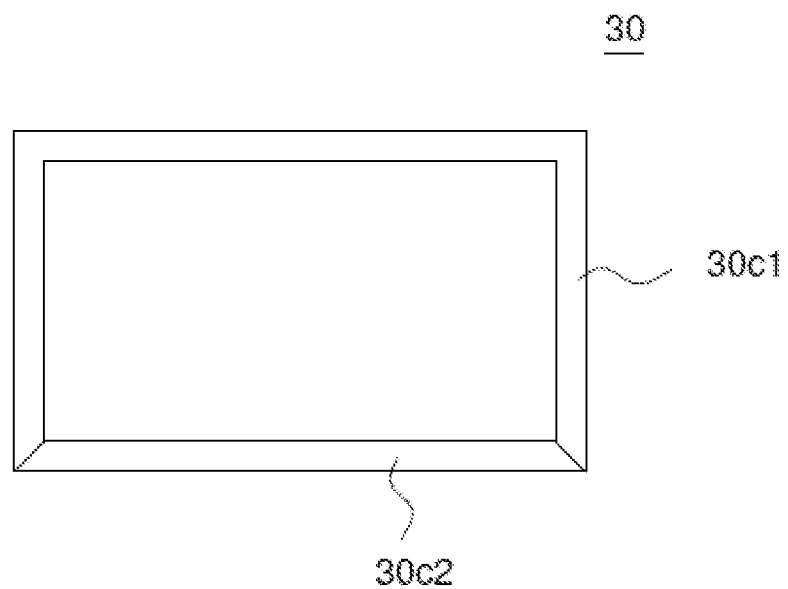

As shown in FIG. 4C, the F-type frame assembly 30 is assembled by two of the F-type frames 30c1, 30c2, one of which (30c1) has an U-shaped top view profile, and the other of which (30c2) has an I-shaped top view profile.

Figure 4D:
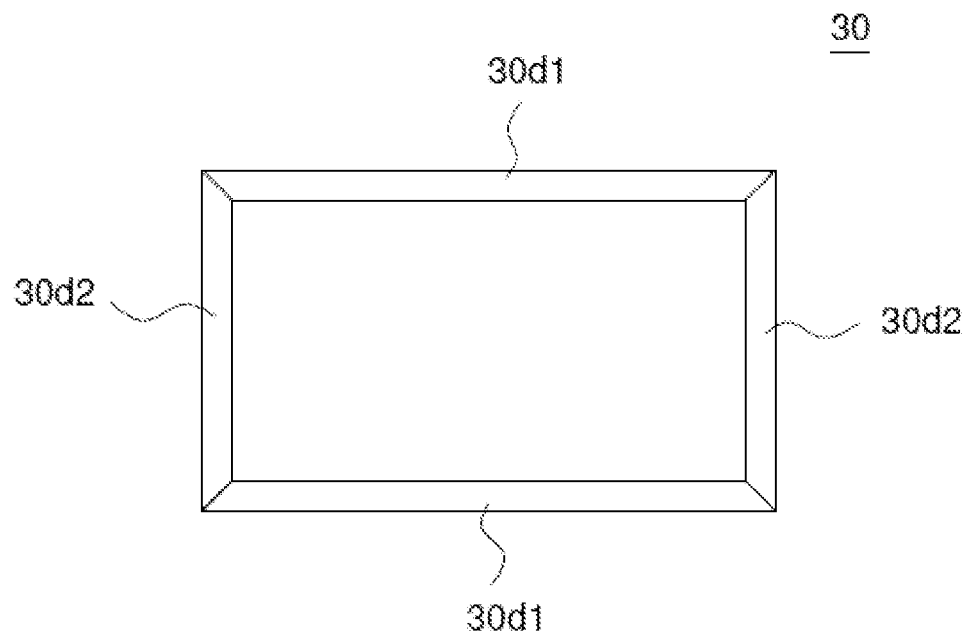

As shown in FIG. 4D, the F-type frame assembly 30 is assembled by four of the F-type frames 30d1, 30d2, each of which has an I-shaped top view profile, wherein the length of the F-type frames 30d1 is different from the F-type frames 30d2.

Figure 4E:
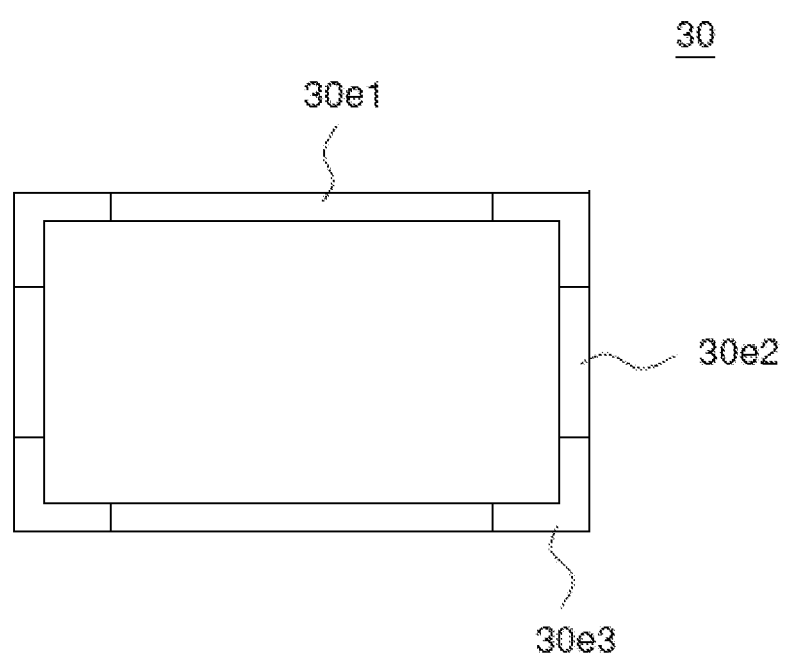

As shown in FIG. 4E, the F-type frame assembly 30 is assembled by the F-type frames 30e1, 30e2, 30e3, one portion of which (30e1, 30e2) has an I-shaped top view profile, and the other portion of which (30e3) has an L-shaped top view profile, wherein the length of the F-type frames 30e1 is different from the F-type frames 30e2.

Hence, according to requirements, an user can design the assembly pattern of the F-type frame assembly 30. When assembling of the F-type frames 30a-30e, it can simultaneously dispose a liquid crystal panel 20 in the first receiving space S1, and then dispose a backlight module 10 in the second receiving space S2 of the F-type frame assembly 30, so as to form the liquid crystal module 100.

As described above, to compare with the traditional technology, it is necessary to have a plastic housing and a front frame for assembly of backlight module and liquid crystal module. In the present invention, by using the F-type frame assembly 30, it can simultaneously assemble and fix the backlight module 10 and the liquid crystal panel 20 to form the liquid crystal module 100 just using a single frame assembly. Hence, the present invention can simplify the frame design of the liquid crystal module 100, so it is advantageous for a development trend that LCD is designed toward narrow frame.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. An assembly method of a liquid crystal module, comprising steps of:
   (a) preparing a plurality of F-type frames separated from each other, wherein each of the F-type frames is one-piece and has a cross-section of F shape, and has a first opening portion located in an upper half thereof and a second opening portion located in a lower half thereof;
   (b) correspondingly disposing the first opening portions and the second opening portions of all of the F-type frames inward to form a first receiving space and a second receiving space, respectively, and then placing a liquid crystal panel in the first receiving space; wherein the liquid crystal module excludes a front frame to fix the liquid crystal panel;
   (c) assembling the F-type frames to form an F-type frame assembly, so that the liquid crystal panel is enclosed and fixed in the first receiving space; and
   (d) placing a backlight module upward into the second receiving space of the F-type frame assembly.

2. The assembly method of the liquid crystal module according to claim 1, wherein the F-type frame assembly is assembled by two of the F-type frames, each of which has an U-shaped top view profile.

3. The assembly method of the liquid crystal module according to claim 1, wherein the F-type frame assembly is assembled by two of the F-type frames, each of which has an L-shaped top view profile.

4. The assembly method of the liquid crystal module according to claim 1, wherein the F-type frame assembly is assembled by two of the F-type frames, one of which has an U-shaped top view profile, and the other of which has an I-shaped top view profile.

5. The assembly method of the liquid crystal module according to claim 1, wherein the F-type frame assembly is assembled by four of the F-type frames, each of which has an I-shaped top view profile.

6. The assembly method of the liquid crystal module according to claim 1, wherein the F-type frame assembly is assembled by the F-type frames, one portion of which have an I-shaped top view profile, and the other portion of which have an L-shaped top view profile.

* * * * *